United States Patent

[15] 3,635,273

Patecell

[45] Jan. 18, 1972

[54] FLAT TIRE SAFETY ROLLER AND WARNING INDICATOR

[72] Inventor: Theodore C. Patecell, 3352 156th St., Flushing, N.Y. 11354

[22] Filed: Oct. 9, 1969

[21] Appl. No.: 865,122

[52] U.S. Cl..............................................152/158, 152/323
[51] Int. Cl.........................................................B60c 17/04
[58] Field of Search..............................152/158, 323; 301/38

[56] References Cited

UNITED STATES PATENTS

| | | | |
|---|---|---|---|
| 2,040,645 | 5/1936 | Dickinson | 152/158 |
| 2,906,312 | 9/1959 | Freedlander | 152/323 |
| 3,049,162 | 8/1962 | Rosenbaum | 152/158 |
| 3,205,928 | 9/1965 | Fishman | 152/323 |
| 3,519,053 | 7/1970 | Lindley | 152/158 |
| 3,420,288 | 1/1969 | Unruh | 152/158 |
| 3,237,667 | 3/1966 | Lindley | 152/158 |

Primary Examiner—Arthur L. La Point
Assistant Examiner—D. W. Keen
Attorney—Howard E. Thompson, Jr.

[57] ABSTRACT

A safety insert or roller for inflatable tires comprising a plurality of arcuate members having detachable and pivotal clamping engagement adapted to form a ring closely engaging the drop center of a tire mounting rim and protruding beyond said rim a substantial distance in the direction of the tread of an inflated tire mounted thereon. At least the inner and outer peripheries of the assembled ring are of rigid plastic material, preferably having lubricant properties, such for example as high-density polyethylene. Connecting structure between said inner and outer peripheries can be of the same material or a different material such as formed metal, and is fashioned to provide a combination of low weight and high tensile and compression strength. Overlapped end portions of the arcuate members when loosely joined together permit relative swinging movement facilitating assembling the device within a tire while half mounted on a rim; and the fastening means for adjacent ends of the arcuate members including bevelled means for providing circumferential clamping of the assembled ring in the tightening thereof.

28 Claims, 10 Drawing Figures

PATENTED JAN 18 1972 3,635,273

INVENTOR
THEODORE C. PATECELL
BY
Howard E. Dempsey Jr.
ATTORNEY

INVENTOR
THEODORE C. PATECELL
BY
*Howard E. Thompson Jr*
ATTORNEY

FLAT TIRE SAFETY ROLLER AND WARNING INDICATOR

BACKGROUND OF THE INVENTION

The problem of increasing the safety of inflatable tires, and particularly the relatively large low-pressure tires intended for high-speed automotive use, has long presented a challenge, particularly with tubeless tires in which air pressure is maintained by the engagement between beads at the inner tire periphery and flanges on a rim or the rim portion of a wheel. The loss of air presents a plurality of difficulties for the motorist. Sudden loss of air, as in the case of a blowout at high speed or even at moderate speed, frequently results in loss of control leading to serious accidents. Furthermore, when a tire is deflated, it is impossible to continue to move the vehicle without serious damage to the tire and possible damage to the vehicle. This creates a secondary problem when tire trouble is encountered on congested highways, causing traffic tieups and jeopardizing the safety of the vehicle's occupants and anyone attempting to replace or repair the tire.

Because it is impossible to drive on a deflated tire, it is essential that all vehicles carry an inflated spare tire together with equipment for quickly making a change in the event of tire trouble. This adds appreciable weight and bulk to the storage facilities of a vehicle which, in many instances, particularly when tires are properly cared for, may constitute, in effect, "excess baggage."

Various attempts have been made in the past to provide insert means within an inflatable tire which might minimize the danger of loss of control in the event of sudden loss of air at high speed and which would permit driving for reasonable distances on a deflated tire. Such approaches have included secondary inflatable units which will expand when the main tire pressure is released, the use of inserts fashioned from rubber or other resilient material of sufficient bulk to carry the load if air pressure is lost, fillers of granular solid material and various types of rigid inserts attached to or associated with the mounting rim providing, in effect, a supplemental wheel projecting beyond the rim edge in the direction of the tread of an inflated tire.

The inflatable insert has the disadvantage that an occurrence which leads to loss of air in the tire itself may also rupture the inflatable insert, rendering it useless. The resilient type of solid insert, which inherently bears against portions of the inflated tire, is objectionable due to the friction and heat generated as a result of the normal flexing of the tire sidewalls in use; and in high-speed travel, anything that causes an increased generation of heat within a tire is inherently objectionable.

Fillers which have been tried include particles of plastic foam, rubber foam and various chemicals. These tend to cause problems due to heat generation because of flexing of a tire when in use. Furthermore, such materials in shifting about can cause changes in weight distribution and dangerous unbalanced conditions. Also extended parking can so compress the filler as to cause a flat spot which will at least temporarily alter the riding qualities of the tire, and tends to increase the possibility of the weight shifting above mentioned.

In principle, a rigid insert associated with the tire rim would appear to be the most practical approach to a reliable safety device; and numerous attempts, as evidenced by issued patents, have been made to provide an effective safety device of this type. These have been generally impractical, however, for various reasons. Some have involved fixed mounting to the rim, which is inherently expensive and complicates the problem of mounting a tire over the assemblage. Others have involved the use of specially constructed rims or rimmed wheels. Typical of patents showing such devices are U.S. Pat. to W. L. Lindley No. 2,986,189 dated May 30, 1961, No. 3,142,326 dated July 28, 1964, and No. 3,180,391 dated Apr. 27, 1965. A further U.S. Pat. to Lindley, No. 3,237,667 dated Mar. 1, 1966, comes somewhat closer to providing a practical solution in the sense that it involves a plurality of arcuate members which can be clamped to a tire rim without modification of the rim. This patent, however, provides at the outer periphery of the insert member, a surface of transverse rubber teeth or serrations which are intended to contact the inner surface of a tire when deflated and "pass the tire through the point of contact with the roadway on rotation without damage." While such a structure might function satisfactorily for a very brief interval, such as the time involved to stop a vehicle in the event of a blowout, any extended riding on the deflated tire would rapidly generate so much heat as to destroy the facing of the insert and/or the tire itself.

The device of Lindley U.S. Pat. No. 3,237,667 is also considered to be structurally unsound since it would be incapable of withstanding the side loads which would be encountered, particularly in steering, when riding on a flat tire. Furthermore, the cost of producing the Lindley device, which cannot be die cast or molded, would be prohibitive.

Thus, in spite of rather extensive prior efforts, it appears that no one heretofore has been able to provide a safety insert for inflatable tires which can be economically produced and easily installed, and which at the same time will permit driving for substantial distances with a deflated tire without significant damage to the tire or insert.

THE INVENTION

It has now been discovered in accordance with the present invention that it is possible to provide a safety tire insert comprising a plurality of arcuate members which, as assembled within a tire, will firmly grasp the tire rim, and which by reason of the nature of the material employed at the inner and outer peripheries thereof, can, when contacted by the inner surface of a deflated tire, permit slippage between the insert and the inner surface of the tire and/or between the insert and the tire rim which prevents a buildup of heat, and permits riding for substantial distances on a deflated tire without damage to the tire or insert. In order to provide this slippage, the inner and outer peripheries of the insert member should be essentially smooth and fashioned from rigid plastic material having appropriate strength for the intended loads, and having by reason of the chemical nature of such plastic material lubricant qualities with respect to the engaged surfaces of the tire and tire rim. It is found, for example, that certain plastic materials such as high-density polyethylene and polypropylene, which can provide the desired structural strength, also provide the type of lubricant effect needed in the engagement with the inner surfaces of the tire and tire rim. It is to be understood, however, that various other plastic materials of either the thermoplastic or thermosetting types can be employed.

The insert unit of the present invention comprises a plurality of arcuate members which can be quickly and easily assembled to a rim which is half inserted within a tire; i.e., one tire bead inside the rim and one outside the rim. For simplicity in production and handling, it is preferable to employ two similar arcuate members having fastening means associated therewith which permit joining such members as a complete ring clamped to the tire rim without the use of any special tools or implements.

In a device of this sort, it is essential to provide compressive strength to withstand the loads generated by a fast-moving vehicle with a tire deflated as well as tensile strength and rigidity to withstand the centrifugal forces of extended high-speed travel with the tire inflated. At the same time, it is important to maintain the overall weight of the insert as low as possible. These objectives can be realized by two basically different approaches. The arcuate members making up the insert can be wholly fashioned from the particular plastic material employed in the inner and outer peripheries thereof with the thickness of the unitary members suitably reduced at points between said inner and outer peripheries to provide an optimum balance of weight vs. compressive and tensile strength. Alternatively, the connecting means between the inner and outer peripheries of the insert can be arcuate members fashioned from metal or plastic material different from that employed at the peripheries of the insert. Here again, the structure and thickness of the connecting means in various radial and circumferential portions thereof will be substantially varied to provide the desired balance of weight vs. compressive and tensile strength.

Improved safety inserts for inflatable tires having the characterizing features above mentioned have been subjected to extensive road testing and found to perform in a highly effective manner. Under normal driving conditions, even at speeds of the order of 70–80 m.p.h., the presence of the inserts within the tires does not affect the performance or comfort of the vehicle. In the event of blowout, even at high speed, the vehicle remains manageable and the tire is prevented from being thrown from the rim and does not incur significant damage beyond the initial damage of the blowout. In the event of a slow leak, the driver will become aware of the fact when the loss of air permits the inner surface of the tire to contact the insert unit due to a noticeably harder ride, but he can continue driving for considerable distances with a partially or completely deflated tire without great discomfort and without any appreciable damage to the tire. It is possible, for example, with a deliberately deflated tire, to continue driving at speeds up to about 20–25 m.p.h. for as much as 8–10 miles, pull into a service station and refill the tire with air, and then drive on as if nothing has happened. Higher speeds are safe and possible, with good controllability of the vehicle, but the increased heat generated may damage the tire.

The ability to thus drive substantial distances on a deflated tire with complete safety and control is due to the limited tire deformation which permits it to remain balanced on the rim or wheel. With the insert in place, the tire beads cannot slide into the drop-center, and the spacing of the outer surface of the insert from the rim edge prevents the sidewalls from completely collapsing, which in turn tends to keep the tire tread in proper alignment. The result is that substantial traction and braking capacity is maintained even with a completely deflated tire.

The practical advantages of this type of performance to the motorist and to the public in general are considered to be quite substantial, particularly when viewed in terms of congested and high-speed parkway travel. By being able to move on at a reasonable speed with a deflated tire, the driver can proceed to an appropriate turnoff point for the next service station for tire change or repair, thereby avoiding the risks to himself and his passengers which would be inherent in stopping, and at the same time, eliminating the traffic tieup which might result if he did stop. Furthermore, by being able to drive at least 8 to 10 miles on a deflated tire without appreciable damage to the tire (and substantially greater distances if one were not concerned about damage to the tire), much automotive travel would be conducted in areas having service stations so frequently spaced that there would be no need for carrying a spare tire or a jack and other tools required to change a tire on the road. Elimination of these items would obviously enhance the effective use of space within the vehicle.

When a tire equipped with the insert is properly inflated, the inner surface of the tire will rarely contact the insert. On the other hand, when a tire is about 25 percent deflated, i.e., when a proper pressure of 28 p.s.i. has dropped to about 21 p.s.i., there will be a noticeable thump when passing over holes or abnormal joints or extrusions in the road; and when the tire is about 50 percent deflated the motorist will feel a slight vibration in the car as he passes over small ripples in the road. Thus, the insert provides a practical warning indicator to the motorist concerning improper tire pressure and/or slow leaks.

Novel features of the improved safety device in accordance with the present invention will be more readily understood from a consideration of the following description taken together with the accompanying drawing, in which certain preferred adaptations are illustrated with the various parts thereof identified by suitable reference characters in each of the views, and in which.

Figure 1:
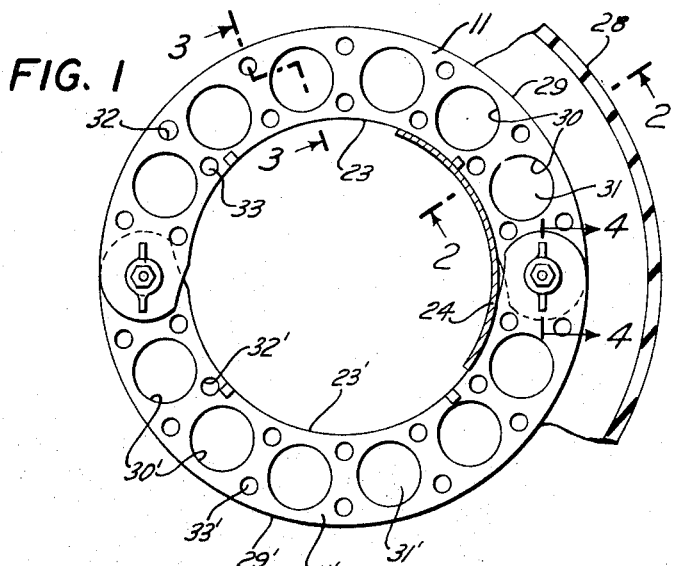
FIG. 1 is a plan view of one form of assembled safety device showing fragmentary association with a tire and rim.
Figure 3:
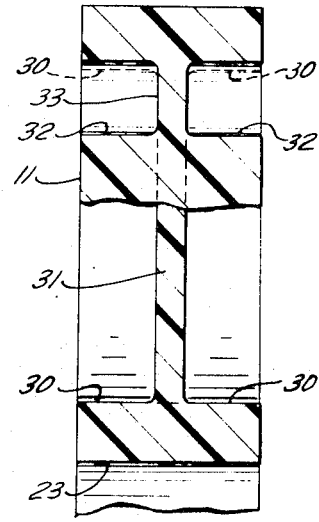
FIG. 3 is a sectional view substantially on the broken line 3—3 of FIG. 1.

The drawing illustrates two basic modifications of the improved safety insert, FIGS. 1–5 relating primarily to an insert in which the inner and outer peripheries are formed integrally with the connecting means therebetween, and FIGS. 6–10, relating to a structure in which inner and outer peripheral bands are secured to arcuate connecting means.

As shown in FIGS. 1–5, the safety insert comprises a pair of similar arcuate members 11, 11', each having male coupling ends 12, 12', and female coupling ends 13, 13'. The coupling ends 12, 13 and 12', 13' are at opposite sides of a transverse centerline of the arcuate members 11, 11' as clearly shown in FIGS. 4 and 5 to provide enlarged bearing surfaces of generally circular contour which overlap at the centerline as clearly shown at 14, 14' in FIG. 4. Centrally of each bearing surface 14' is an aperture 15' registering with a threaded nut or socket 16' which is fixedly secured to the coupling end 13'. The nut or socket 16' can be embedded within the material of the coupling end 13' or can be secured thereto by suitable rivets or fasteners as indicated at 17'.

The aperture 15' and the threaded nut or socket 16' receive the end of a threaded bolt 18 extending through the male coupling part 12 and having an appropriate wing head or fingerpiece 19 engaging the outer surface of the coupling end 12. The portion of the bolt 18 passing through the coupling end 12 is provided with a bevelled enlargement 20 having a larger diameter adjacent the outer surface of the coupling end 12 and a smaller diameter adjacent the inner surface thereof and adapted to seat in a correspondingly tapered aperture 21 extending through the coupling end 12. The bolt assemblage including the shank 18, fingerpiece 19, and bevelled portion 20, can be completely detachable from the coupling end 12, but is preferably loosely coupled therewith by suitable restraining means, as will be hereinafter described when discussing FIG. 9 of the drawing.

Figure 2:
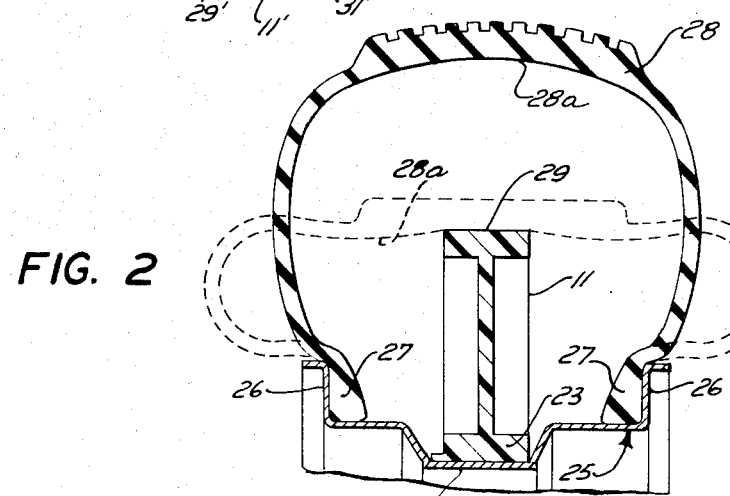
FIG. 2 is a sectional view substantially on the line 2—2 of FIG. 1.
Figure 5:
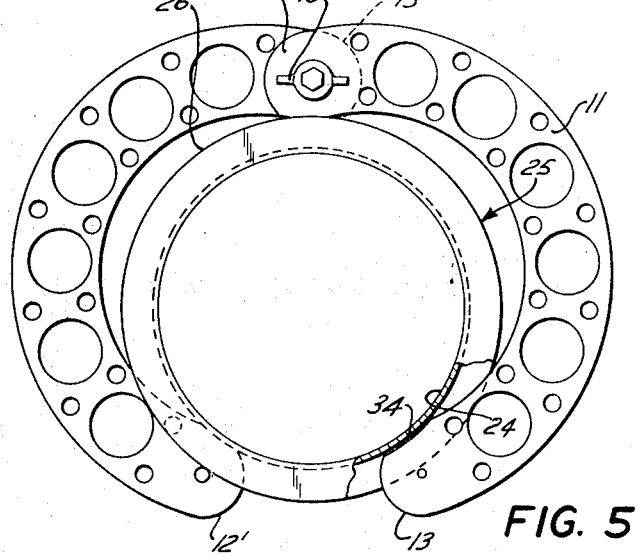
FIG. 5 is a plan view showing the device of FIG. 1 partially extended and illustrating the relative position assumed in the operation of applying the same to a tire rim.
Figure 4:
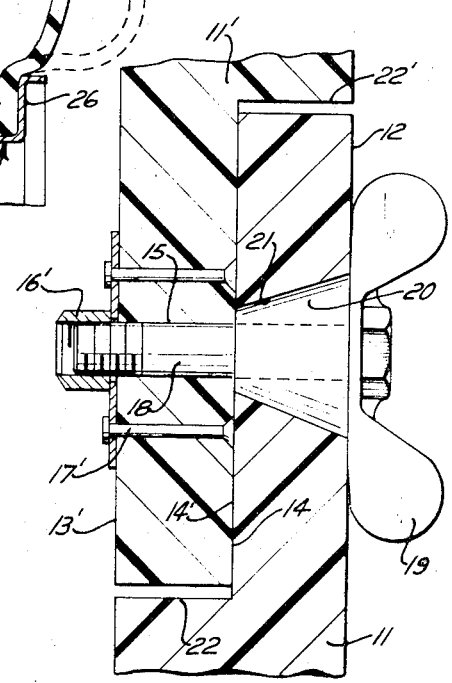
FIG. 4 is a view partially in section substantially on the line 4—4 of FIG. 1.

The inner diameter of the aperture 21 is somewhat larger than the diameter of the aperture 15' as will be clearly seen in FIG. 4 of the drawing, permitting the parts to be initially assembled in partial nonalignment and brought into alignment by the action of the tapered portion 20 of the bolt moving transversely of the surface 21 as the bolt is tightened. It will be apparent that this relative movement has the effect of reducing the circumferential dimension of the assemblage as the coupling ends are clamped together. As thus clamped together, it will be noted that the rounded end surface of the respective clamping ends fit within closely conforming cutout contours 22, 22' of the opposing arcuate member. These rounded contours have the same center of curvature as the axis of the bolt 18, whereby during loose association of one pair of coupling ends as seen in FIG. 5, the parts will have substantial swinging movement about the bolt 18. The inner peripheries 23, 23' of the arcuate members are intended, when the members are fully clamped together, to have a close peripheral and clamping engagement with the drop-center 24 of a tire rim 25 having outwardly extending side flanges 26 as seen in FIG. 2 for sealably engaging inner edges or beads 27 of an inflatable tire 28. The outer peripheries 29, 29' of the arcuate members provide in the fully assembled device a circular surface concentric with the inner peripheries 23, 23' and protruding outwardly from the rim flanges 26 a distance of the order of 30–60 percent of the protruding distance of the inner surface 28a of an inflated tire tread.

As shown in the drawing, the inner and outer peripheries of the arcuate members 11, 11' are of substantial width. This width is generally of the order of 1½ to 1¾ inches for the average tire of moderate size, but can be larger or smaller in adapting the device for use with tires and rims of different size and type. With tires of the so-called wide oval type, it may be desirable, as more fully hereinafter described in connection with FIGS. 6–9, to provide extra width in the outer periphery of the safety insert. It will also be understood that in certain instances special shape or contour in a particular drop-center 24 of a rim or wheel may require corresponding shaping of the inner peripheral contour of the safety insert. In the majority of instances, however, there will be sufficient width in the drop-center 24 to permit the proper seating of an insert unit having an inner periphery of cylindrical curvature as shown in the drawing.

It is preferable to provide a plurality of spaced lugs as indicated at 11a on one side of the arcuate members 11, 11' to rather snugly fit the drop-center 24 and thereby maintain the insert in proper alignment on the wheel or rim 25. The lugs 11a, if present, should be on the same side of the insert unit as the fingerpieces 19 to aid in mounting as hereinafter described.

The arcuate members 11, 11' of the device as shown in FIGS. 1–5 constitute cast or molded bodies providing integral connecting means between the inner peripheries 23, 23' and the outer peripheries 29, 29'. Each of the arcuate members is provided with a plurality of large recesses 30, 30' on opposed surfaces thereof having a depth less than half the thickness of the insert members to leave web portions 31, 31'. Other smaller recesses 32, 32' adjacent the inner and outer peripheries and between the recesses 30, 30' also extend to a depth less than half the thickness of the arcuate members 11, 11' to leave web portions 33, 33'.

The web portions 31, 31' and 33, 33', while generally of the order of one-fourth inch in thickness, can be varied substantially with different size devices and with different physical properties such as tensile and compressive strength in the material of construction. The function of the recesses is to reduce as much as possible the weight of the assemblage without sacrificing essential compressive and tensile strength. Furthermore, the employment of recesses leaving web portions as above described facilitates molding, providing improved flow of material within mold cavities as compared with a device having apertures extending completely through the structure. It should be understood, however, that effective combinations of weight and strength can also be achieved in structures wherein the web portions 31, 31' and 33, 33' are omitted so that apertures extend completely through the device. Furthermore, the number and arrangement of the recesses is merely illustrative and can be substantially varied. It is desirable, however, that any arrangement of recesses or apertures should be selected with a view to maintaining balance in the assembled insert to thereby avoid vibration in the high-speed rotation of a rim or wheel on which the device is mounted.

In assembling the device on a wheel or rim, a tire is first half mounted on the rim; i.e., one bead within the rim and one bead outside the rim. With most wheel or rim constructions, the bead of the outer tire wall should be first mounted on the rim. The separate arcuate members 11, 11a are then placed within the tire but outside the rim and one pair of coupling ends 12, 13' are loosely joined together as shown in FIG. 5. The free coupling ends 12', 13 are then inserted in the drop-center 24 of the rim 25 and the loosely joined coupled ends 12, 13' are forced upwardly as seen in FIG. 5 to pass over the rim edge or flange 26. In this position, the previously inserted ends 12', 13 and portions of the outer peripheries of the arcuate members 11, 11' will bear against the inner surface 28a of the tire, tending to restrict movement over the rim edge as above described, and to facilitate this mounting step it is desirable on the coupling ends 12, 13' and 12', 13 to provide small arcuate cutouts 34 generally conforming to the curvatures of the drop-center and edge of the rim 25. When the joined ends of the arcuate members 11, 11' are within the frame, they are brought into engagement with the drop-center 34, the free ends 12', 13 are brought together and loosely joined by means of the bolt or fastener 18.

The assemblage is then properly oriented with respect to the drop-center 24 and both fastening elements are tightened by rotation of the wing heads or fingerpieces 19, which are disposed in the direction of the inner wall of the tire. The inner tire bead is then inserted within the rim in the conventional manner and the assemblage is ready for inflation of the tire. As is customary with tubeless tires, the internal air pressure acts to properly seat the tire beads 27 against inner surfaces of the rim flanges 26 to thereby seal air within the tire. It will be noted that orientation of the lugs 11a on the same side of the insert unit as the fingerpieces 19 provides some room for movement of the inner tire bead into the drop-center to facilitate the insertion of this bead within the rim flange 26.

As shown in the drawing, the assembled unit within a tire, with the inner peripheries 23, 23' in clamping engagement with the rim drop-center 24 protrude outwardly from the rim edge so that the outer peripheries 29, 29' are located essentially midway between the rim edge and the inner surface 28a of the inflated tire. The extent of this projection as shown in FIG. 2 is approximately 45 percent of the distance to the inner surface 28 of the tire, but this distance can be varied substantially within the range of about 30–60 percent of the distance from the rim edge to the tire surface.

When the arcuate members 11, 11' of the device as shown in FIGS. 1–5 are fashioned from high-density polyethylene or polypropylene, the inherent lubricant qualities of such materials permit relative sliding movement between the inner peripheries 23, 23' and the drop-center 24 and between the outer peripheries 29, 29' and the inner tire surface 28a when lack of air within the tire permits the road pressure to flatten or deflect the tire tread 28 so that the inner surface thereof engages the insert as shown in FIG. 2. To the extent that the circumference of the inflated tire differs from the circumference of the outer periphery 29, 29' of the insert, it is necessary to provide this amount of relative slippage in each revolution of the tire while riding on the tire in a deflated condition. Thus, the lubricant characteristics are of primary importance in minimizing the generation of heat and associated damage to either the insert or the tire.

The compressive and tensile strength of the moldable material such as high-density polyethylene and polypropylene can be substantially increased by incorporating inorganic filler materials including, in particular, fibrous fillers such as glass fiber filaments. The amount of such filler can be of the order of 25–30 percent by weight of the molding composition.

Turning now to the modification shown in FIGS. 6–9 of the drawing, arcuate members 35, 35' are made up of arcuate cores or spacers 36, 36' having inner peripheral bands 37, 37' and outer peripheral bands 38, 38' firmly bonded thereto. As clearly shown in FIG. 8 of the drawing, the cores or spacers 36, 36' are of generally I-beam cross-sectional form having inner peripheral flanges 39, 39', outer peripheral flanges 40, 40', and perpendicularly disposed connecting webs 41, 41'. At regularly spaced intervals are radially disposed stiffening members 42, 42' integrally joining the inner and outer peripheral flanges and webs to form a rigid lightweight structure. The wall thicknesses of these flanges and webs can vary considerably, depending upon rim and tire size and expected loads for which the device is intended, as well as the material of construction and its compressive and tensile strength. When working with parts formed of cast or molded aluminum and with average automotive tires, these wall thicknesses will be suitably of the order of one-fourth inch, although the thickness of the inner flange and connecting web may suitably be less than the thickness of the outer flange.

The peripheral bands 37, 37' and 38, 38' are secured to the flanges 39, 39' and 40, 40' respectively by suitable bonding or fastening means, and for purposes of illustration, the bands have been shown secured to the flanges by flat head bolts 43 recessed in the bands and extending through the flanges to the inwardly disposed nuts 44. The bolts 43 are suitably spaced at uniform 2- to 3-inch intervals circumferentially of the bands and intermediate the radial stiffening members 42, 42'.

Figure 9:
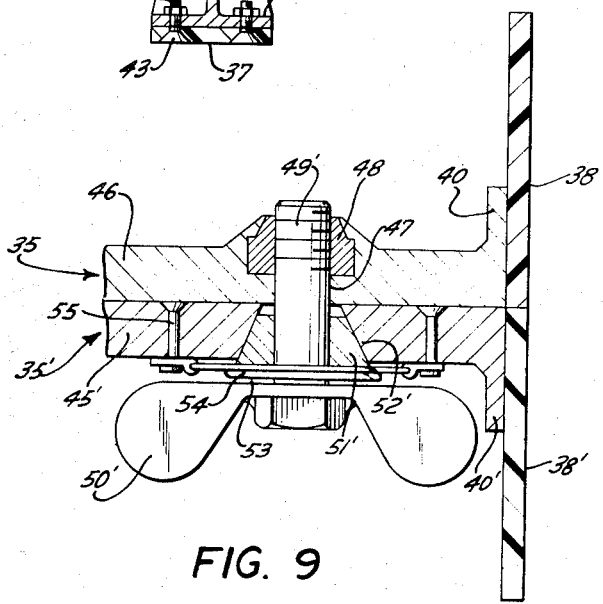
FIG. 9 is a sectional view substantially on the line 9—9 of FIG. 6.
Figure 10:
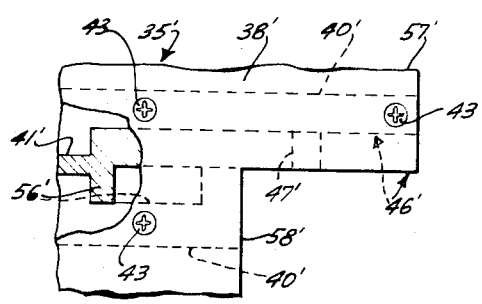
FIG. 10 is a fragmentary view in the direction of the arrows 6—6 of FIG. 7.

As with the device shown in FIGS. 1-5, the arcuate members 35, 35' and the cores 36, 36' thereof are provided with male coupling ends 45, 45' and female coupling ends 46, 46' providing essentially circular bearing surfaces disposed at opposite sides of the centerline of the device as seen in FIGS. 9 and 10 of the drawing. The female coupling ends include central apertures 47, 47' terminating in a threaded nut or socket 48, 48', which is suitably a locknut securely anchored in the coupling end. The male coupling parts carry fastening means suitably in the form of bolts 49, 219' threaded for engagement with the nuts 48, 48' and having outwardly extending wings or fingerpieces 50, 50'. Portions of the bolts 49, 49' adjacent the fingerpieces 50, 50' have tapered enlargements 51, 51' seating within correspondingly tapered apertures 52, 52' in the male coupling ends 45, 45' which function in the same manner as the structure previously described in FIG. 5.

It is desirable that the bolts 49, 49' be supported on the coupling ends 45, 45' in general alignment with the tapered apertures 52, 52' to be readily accessible for manipulation within a tire, when mounting the safety device. This can be accomplished by various types of resilient straps or springs, and for purpose of illustration there is shown in FIG. 9 of the drawing an annular groove 53 between the fingerpiece 50' and the tapered enlargement 51' receiving a spring ring 54 which, in turn, is secured to the coupling end 45' by suitable fasteners or rivets 55. The spring ring 54 permits free rotation and limited axial movement of the bolt 49'.

Figure 6:
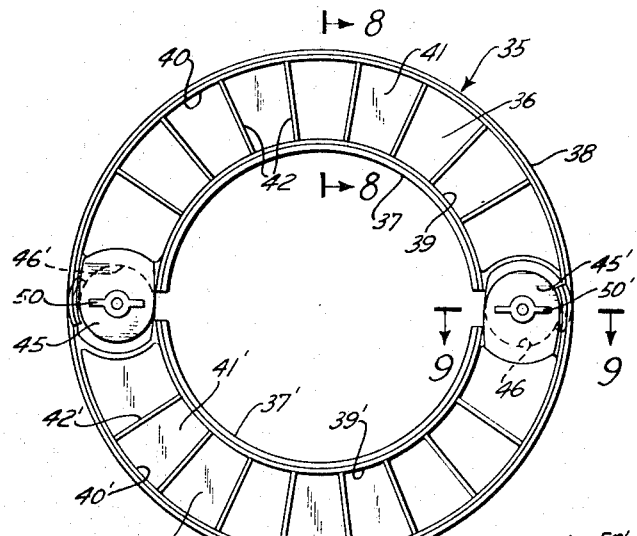
FIG. 6 is a plan view of a modified form of insert unit.
Figure 7:
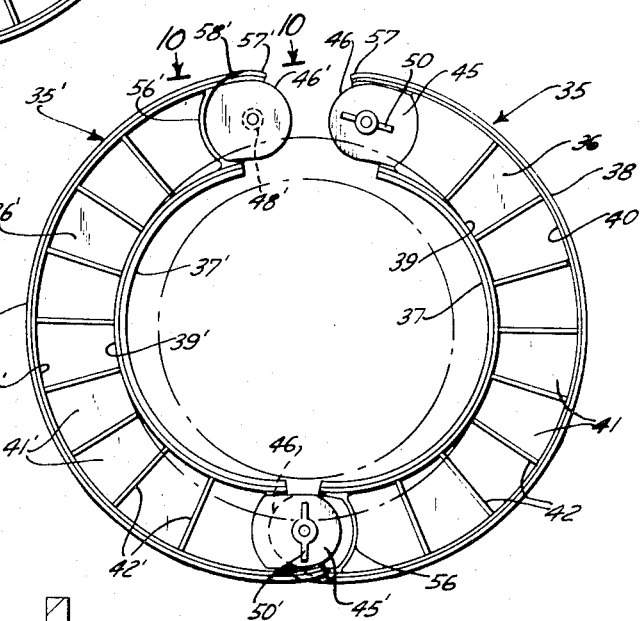
FIG. 7 is a composite view of the device shown in FIG. 6 in a position of partial assemblage.

In order to suitably strengthen the coupling ends, it will be noted from a consideration of FIG. 10 that each coupling end, of which 46' is representative, is substantially thicker than the associated web 41'; and the inner peripheries of the coupling ends are defined by arcuate ribs 56, 56' extending beyond the webs 41, 41' (note FIGS. 6, 7 and 10). Also having reference to FIGS. 7 and 10, it will be noted that the leading edge 57, 57' of each coupling end curves inwardly and the trailing edge 58, 58' is undercut to receive the leading edge of an associated coupling end. This interfitting of the coupling ends permits limited pivotal movement of the partly assembled arcuate members 35, 35', while maintaining a minimum break or interruption in the circumferential surface of the bands 38, 38' when the device is fully assembled as in FIG. 6.

At the inner periphery of the assembled device, it will be noted that there is slight spacing between the inner bands and flanges 37, 39 and 37', 39' adjacent the coupling ends. This serves to provide the type clearance helpful in mounting the device on a rim within a tire as described in connection with FIG. 5.

Figure 8:
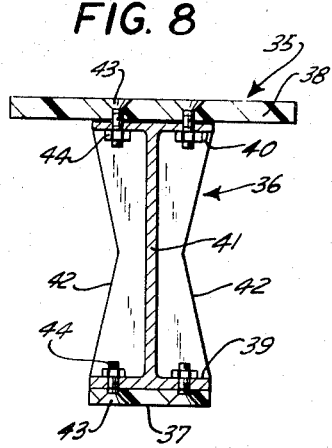
FIG. 8 is a sectional view substantially on the line 8—8 of FIG. 6.

The inner and outer peripheral bands 37, 37' and 38, 38' can be the same width as the associated flanges 39, 39' and 40, 40'. On the other hand, when intended for use in large tires of the so-called "wide oval" type, it is desirable to employ outer bands 38, 38' which are substantially wider than the associated flanges 40, 40' as seen in FIGS. 8 to 10.

The added width of the bands 38, 38' restrains the large, wide oval, tires from lateral shifting and tends to maintain, when in the flattened condition, the symmetrical contour shown in FIG. 2. The bands are suitably fashioned from plastic or filled plastic materials of the types previously described in connection with FIGS. 1 to 5. The outer bands 38, 38' can, if desired, be further reinforced by having imbedded therein one or more plies of glass fiber strands, fabric woven from glass fiber strands, or similar reinforcing means.

The inner bands 37, 33' can be suitably contoured to conform to the shape of the particular rim drop-center in which it is to be mounted. In this connection, it will also be understood that in some instances the bands may include protruding lugs similar to the lugs 11a, previously described, to properly position the insert unit in a wider drop-center.

The thickness of the bands 37, 37' and 38, 38' can suitably be about one-fourth inch, but can be varied considerably depending on the size of the safety insert, the loads for which it is intended, and the strength of the plastic material employed in the bands. As earlier mentioned, lubricant properties provided by the plastic material at inner and outer peripheries of the insert are of importance in minimizing heat buildup when driving on a deflated tire.

Both the primarily plastic safety inserts of FIGS. 1 to 5 and the combined metal and plastic inserts of FIGS. 6 to 10 have been extensively tested and formed comparable in performance and ease of use. The structure with the peripheral plastic bands and connecting metal arcuate parts tends to be slightly heavier, but they are more dimensionally stable under conditions of extended high-speed driving. When riding on deflated tires, on the other hand, the all-plastic devices appear to be more resistant to deformation and damage due to roughness in the road being traveled. Either type of safety insert or roller is good for the life of the car and interchangeable with other cars having rims or wheels with the same drop-center dimensions. The inserts weigh approximately one-half as much as average tires for which they are intended (and less than one-half as much as heavy-duty tires). The cost should be less than that of an average tire, and less than one-half the cost of premium tires with punctureproof features. Thus it is considered that there should be a ready market for both types of devices with the selection of type being based on driving habits, type roads normally traveled, and the like.

Various changes and modifications in the safety devices for inflatable tires as herein disclosed will occur to those skilled in the art, and to the extent that such changes and modifications are embraced by the appended claims, it is to be understood that they constitute part of the present invention.

What is claimed is:

1. A safety insert for inflatable tires of the tubeless type wherein beads at the inner open periphery of the tire are adapted to sealably engage side flanges of a mounting rim and said rim intermediate the flanges has a drop-center of reduced diameter facilitating attachment and detachment of the tire, said safety device comprising a plurality of similar arcuate members, each of said arcuate members having at each end essentially circular coupling portions of reduced thickness in the plane of said members to interfit with coupling portions on adjacent members, said circular portions having at the centers thereof coacting coupling means providing, when loosely coupled, wide coplanar pivotal movement of adjacent arcuate members, whereby after partial assemblage within a tire, and then mounting one tire bead on a rim, the subassemblage can be passed over the rim and into the drop-center thereof for final assemblage about the rim by coupling a single joint, and said coupling means providing firm clamping of interfitting coupling portions of said plurality of arcuate members to form a ring member having an inner periphery seating in the drop-center of said rim and an outer periphery protruding beyond the flanges of said rim, said inner and outer peripheries of the ring being formed of rigid plastic material having lubricant qualities, and means joining said inner and outer peripheries in a lightweight structure providing a radial compressive strength appropriate to withstand the loads for which the particular tire is intended.

2. A safety insert for inflatable tires as defined in claim 1 wherein the means joining said inner and outer peripheries comprises rigid plastic material formed integrally with said inner and outer peripheries.

3. A safety insert for inflatable tires as defined in claim 1 wherein the means joining said inner and outer peripheries comprises rigid plastic material formed integrally with said inner and outer peripheries, and having varied transverse dimension and thickness to provide an optimum balance of high strength and low weight.

4. A safety insert for inflatable tires as defined in claim 3 wherein portions of the means joining said inner and outer peripheries have the same width or transverse dimension as said peripheries and other portions may be of reduced dimension of the order of one-eighth to one-fourth inch in thickness.

5. A safety insert for inflatable tires as defined in claim 4 wherein said portions of reduced dimension are recesses uniformly spaced circumferentially of said ring to provide balance and minimize centrifugal strain in the high-speed rotation of the ring.

6. A safety insert for inflatable tires as defined in claim 1 wherein the means joining said inner and outer periphery of each arcuate member comprises a separate body portion having inner and outer bands of concentric circular contours, an integral connecting web perpendicular to said bands and a plurality of radially disposed stiffening members protruding from opposed sides of said web and integrally joined to said web and said inner and outer bands.

7. A safety insert for inflatable tires as defined in claim 6 wherein said separate body portion is fashioned from metal and the inner and outer bands of said metal body have firmly secured thereto inner and outer bands of said rigid plastic material, said bands of plastic material being at least as wide as the bands of said metal body.

8. A safety insert for inflatable tires as defined in claim 7 wherein the outer band of plastic material is substantially wider than the outer band of said metal body.

9. A safety insert for inflatable tires as defined in claim 1 wherein the inner periphery of said ring member is of a width to fit into the drop-center of said rim, and the outer periphery is at least as wide as said inner periphery.

10. A safety insert for inflatable tires as defined in claim 9 wherein said outer periphery is substantially wider than said inner periphery.

11. A safety insert for inflatable tires as defined in claim 1 wherein the inner periphery of said ring member includes means adapting said ring to engage the full width of said drop-center.

12. A safety insert for inflatable tires as defined in claim 11, wherein said last-named means comprises a plurality of circumferentially spaced lugs protruding from said inner periphery at one side of said ring member.

13. A safety insert for inflatable tires as defined in claim 1 wherein each of said arcuate members has at one end an essentially circular coupling portion extending to one side of the longitudinal centerline of said member, and at the other end an essentially circular coupling portion extending to the other side of said centerline, said first end carrying in the center of said circular portion a female coupling means and said second end carrying in the center of said circular portion, a male coupling means.

14. A safety insert for inflatable tires as defined in claim 13 wherein said male coupling means comprises a bolt having an elongated shank and protruding actuating head, the portion of said shank adjacent said actuating head having a frustoconical taper adapted to seat in a similarly tapered aperture in the associated end of said member, and the remainder of said shank being of uniform reduced diameter and adapted to engage the female coupling means of a coacting member, said frustoconical shank and aperture imparting a circumferential clamping action when said bolt is tightened in assembling a plurality of said members as a complete ring.

15. A safety insert for inflatable tires as defined in claim 13 wherein adjacent members, when loosely joined by engagement of said male and female coupling means, are capable of relative pivotal movement about said coupling means facilitating mounting of said loosely joined members on a rim within a tire while one bead thereof is disposed within said rim.

16. A safety insert for inflatable tires as defined in claim 15 wherein said circular coupling portions have small portions of reduced radial dimension so positioned as to reduce the degree of protrusion of said pivoted members from a rim edge when the free ends thereof are within the drop-center of said rim and the pivotably coupled portions are being passed over said rim edge.

17. A safety insert for inflatable tires as defined in claim 13, wherein said circular coupling portions extend to the outer periphery of said members and overlap at said centerline to provide circumferential continuity in the outer periphery of the assembled ring member.

18. A safety insert for inflatable tires as defined in claim 1 wherein the radial dimension of said elements is such that when arranged in a tire and rim assembly, with the inner periphery closely engaging said drop-center of the rim, the outer periphery protrudes beyond the rim edge a distance which is about 30–60 percent of the protrusion of the inflated tire from said rim edge.

19. A safety insert for inflatable tires as defined in claim 1 wherein said rigid plastic material is polyethylene.

20. A safety insert for inflatable tires as defined in claim 1 wherein said rigid plastic material is high-density polyethylene.

21. A safety insert for inflatable tires as defined in claim 1 wherein said rigid plastic material is polypropylene.

22. A safety insert for inflatable tires as defined in claim 1 wherein said rigid plastic material contains inorganic filler.

23. A safety insert for inflatable tires as defined in claim 22, said inorganic filler includes fiberglass filaments.

24. A safety insert for inflatable tires as defined in claim 1 wherein said plastic material, at least adjacent the surface of said outer periphery includes stiffening means.

25. A safety insert for inflatable tires as defined in claim 24 wherein said stiffening means comprises fiberglass filaments imbedded in said plastic material.

26. A safety insert for inflatable tires as defined in claim 24 wherein said stiffening means comprises a woven body of fiberglass filaments imbedded in said plastic material.

27. A safety insert for inflatable tires as defined in claim 24 wherein the plastic material containing said stiffening means comprises separate bands peripherally secured to said arcuate members.

28. A safety insert for inflatable tires as defined in claim 28 wherein said separate bands at the outer periphery of said arcuate members are substantially wider than the remainder of said arcuate members.

* * * * *